United States Patent
Rong et al.

(10) Patent No.: US 12,534,608 B2
(45) Date of Patent: Jan. 27, 2026

(54) HIGH ABRASION RESISTANCE HOSE COVER

(71) Applicant: ContiTech USA, Inc., Fairlawn, OH (US)

(72) Inventors: Guangzhuo Rong, Hudson, OH (US); Thomas George Burrowes, North Canton, OH (US)

(73) Assignee: ContiTech USA, Inc., Fairlawn, OH (US)

( * ) Notice: Subject to any disclaimer, the term of this patent is extended or adjusted under 35 U.S.C. 154(b) by 917 days.

(21) Appl. No.: 16/674,291

(22) Filed: Nov. 5, 2019

(65) Prior Publication Data
US 2021/0130596 A1    May 6, 2021

(51) Int. Cl.
*C08L 23/286* (2025.01)
*F16L 11/08* (2006.01)
*F16L 57/04* (2006.01)

(52) U.S. Cl.
CPC .............. *C08L 23/286* (2013.01); *F16L 11/08* (2013.01); *F16L 57/04* (2013.01); *C08L 2201/02* (2013.01); *C08L 2205/025* (2013.01); *C08L 2205/03* (2013.01); *C08L 2207/062* (2013.01); *F16L 11/085* (2013.01)

(58) Field of Classification Search
CPC ....................................................... F16L 11/08
See application file for complete search history.

(56) References Cited

U.S. PATENT DOCUMENTS

| | | | | |
|---|---|---|---|---|
| 3,322,711 | A * | 5/1967 | Bush | B32B 27/00 525/388 |
| 4,322,480 | A * | 3/1982 | Tuller | B32B 27/34 428/476.3 |
| 4,507,418 | A | 3/1985 | Utsunomiya et al. | |
| 5,087,669 | A * | 2/1992 | Prejean | C08L 27/06 525/227 |
| 6,386,239 | B1 * | 5/2002 | Ramey | B32B 1/08 138/125 |
| 6,994,210 | B2 | 2/2006 | Kerwel et al. | |
| 7,371,446 | B2 | 5/2008 | Kerstetter, III et al. | |
| 7,842,354 | B2 | 11/2010 | Wood et al. | |
| 8,007,917 | B2 | 8/2011 | Alexander | |
| 8,030,404 | B2 | 10/2011 | Burrowes | |
| 8,910,780 | B2 | 12/2014 | Pero et al. | |
| 9,962,906 | B1 | 5/2018 | Maguire et al. | |
| 10,442,925 | B2 | 10/2019 | Rong et al. | |
| 2002/0042464 | A1 * | 4/2002 | Barclay | C08K 5/0025 524/451 |
| 2006/0100328 | A1 * | 5/2006 | Goossens | C09K 21/14 524/404 |
| 2008/0202619 | A1 * | 8/2008 | Hirai | F16L 11/085 138/137 |
| 2012/0090720 | A1 * | 4/2012 | Burrowes | B32B 5/26 138/124 |
| 2013/0126031 | A1 * | 5/2013 | Sont | B29C 48/08 156/172 |
| 2018/0127570 | A1 * | 5/2018 | Tsunenishi | C08L 27/24 |
| 2018/0231152 | A1 * | 8/2018 | Clark | C08K 3/36 |
| 2018/0264771 | A1 * | 9/2018 | Speidel | B32B 1/08 |

OTHER PUBLICATIONS

Benham et al, Journal of Applied Polymer Science, 20, 3295-3303, 1976 (Year: 1976).*

* cited by examiner

*Primary Examiner* — Irina Krylova
(74) *Attorney, Agent, or Firm* — Lippes Mathias LLP

(57) ABSTRACT

Hoses include inner tube, a reinforcement layer disposed outwardly from the inner tube, and a cover layer disposed outwardly from the reinforcement layer, and the cover layer and/or inner tube is based on a cured composition formed from a mixture containing a blend of chlorinated polyethylene (CPE) and cross-linkable oxidized high density polyethylene (oxidized HDPE), where the CPE and oxidized HDPE are blended in a CPE:oxidized HDPE weight ratio of from 10:1 to 1:1, and a peroxide curing system. The peroxide curing system used in some compositions according the disclosure include alpha-alpha-bis(t-butylperoxy)diisopropylbenzene and trimethylolpropane trimethacrylate.

14 Claims, 2 Drawing Sheets

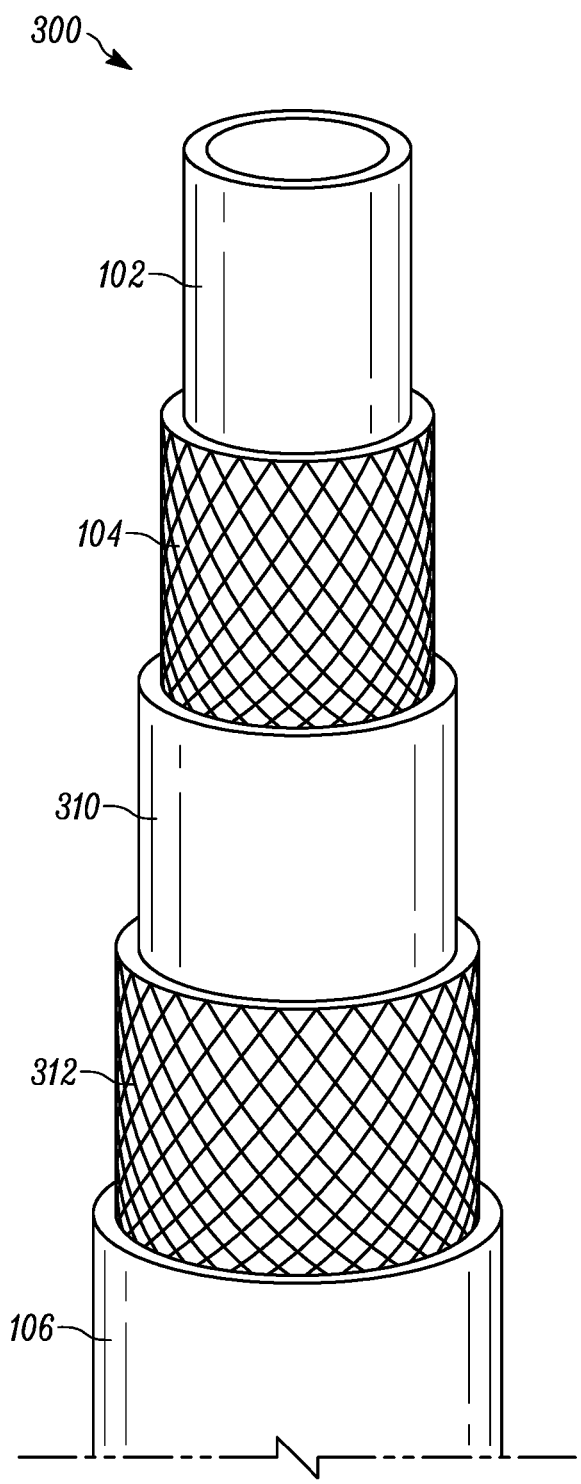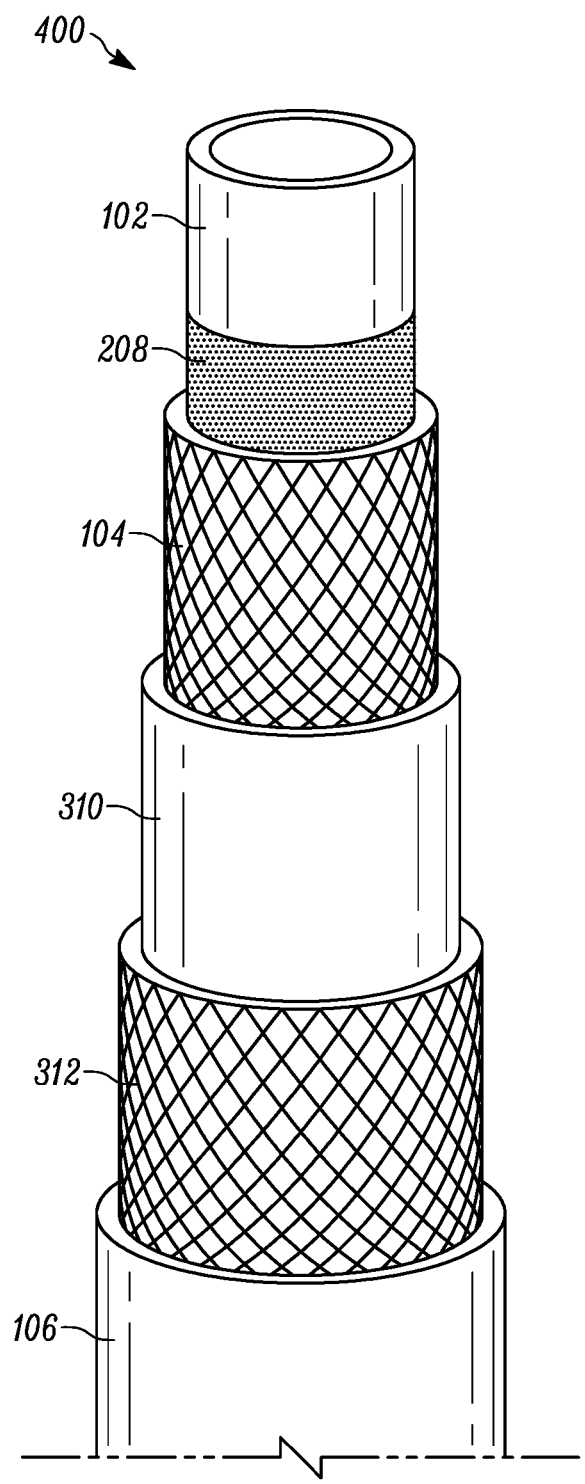

HIGH ABRASION RESISTANCE HOSE COVER

FIELD

The field to which the disclosure generally relates to rubber compositions, and specifically to rubber compositions useful for providing hose or other rubber based articles having high abrasion resistance.

BACKGROUND

This section provides background information to facilitate a better understanding of the various aspects of the disclosure. It should be understood that the statements in this section of this document are to be read in this light, and not as admissions of prior art.

For hose applications which require high abrasion resistance, a carboxylated NBR (XNBR) cover is often used. Typical XNBR covers have a non-rotating DIN abrasion value of from about 125 to about 140. Although XNBR covers provide good abrasion resistance, there are always a demand for better abrasion resistance covers.

In some cases, a thin layer of ultra high molecular weight polyethylene (UHMWPE) film is coated onto a normal hose cover surface to provide better abrasion resistance than XNBR covers. UHMWPE film, which is applied on hose cover surface, is prone to delamination, cracking or erosion from the cover surface during service, thereby losing abrasion resistance. Application of such a film also presents significant difficulties in the hose manufacturing process and the film is detrimental to the flexibility of the finished hose.

Hence, it is desirable to have rubber formulations with better abrasion resistant cover than XNBR, while avoiding the use of a thin UHMWPE film, such need is met, at least in part, with embodiments according to this disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, compositions include a blend of chlorinated polyethylene (CPE) and cross-linkable oxidized high density polyethylene (oxidized HDPE), where the CPE and oxidized HDPE are blended in a CPE:oxidized HDPE weight ratio of from 10:1 to 1:1, and a peroxide curing system. The compositions may have a DIN abrasion resistance value of 70 or less after curing, and the peroxide curing system may be devoid of free sulfur. In some cases, the compositions contain antimony trioxide. The peroxide curing system used in some compositions according the disclosure include alpha-alpha-bis(t-butylperoxy)diisopropylbenzene and trimethylolpropane trimethacrylate, and the alpha-alpha-bis(t-butylperoxy)diisopropylbenzene may be incorporated in an amount of from 4 phr to 8 phr, while the trimethylolpropane trimethacrylate may be incorporated in an amount of from 3 phr to 6 phr. In some cases, the CPE:oxidized HDPE weight ratio is of from 7:1 to 3:1. The compositions may be incorporated into one or more layers of rubber articles.

In another aspect of the disclosure, hoses include inner tube, a reinforcement layer disposed outwardly from the inner tube, and a cover layer disposed outwardly from the reinforcement layer, and the cover layer is based on a cured composition formed from a mixture containing a blend of chlorinated polyethylene (CPE) and cross-linkable oxidized high density polyethylene (oxidized HDPE), where the CPE and oxidized HDPE are blended in a CPE:oxidized HDPE weight ratio of from 10:1 to 1:1, and a peroxide curing system. The peroxide curing system used in some compositions according the disclosure include alpha-alpha-bis(t-butylperoxy)diisopropylbenzene and trimethylolpropane trimethacrylate, and the alpha-alpha-bis(t-butylperoxy)diisopropylbenzene may be incorporated in an amount of from 4 phr to 8 phr, while the trimethylolpropane trimethacrylate may be incorporated in an amount of from 3 phr to 6 phr. In some cases, the CPE:oxidized HDPE weight ratio is of from 7:1 to 3:1. The cured composition may have a DIN abrasion resistance value of 70 or less. The peroxide curing system may be devoid of free sulfur, and the mixture may also contain antimony trioxide. In some cases, the inner tube is based upon a similar or like composition used for the cover layer, while in some other cases the inner tube is based upon nitrile butadiene rubber (NBR).

Yet other aspects of the disclosure are hoses having an inner tube, a reinforcement layer disposed outwardly from the inner tube, and a cover layer disposed outwardly from the reinforcement layer, where the inner tube contains a cured composition formed from a mixture of a blend of chlorinated polyethylene (CPE) and cross-linkable oxidized high density polyethylene (oxidized HDPE), where the CPE and oxidized HDPE are blended in a CPE:oxidized HDPE weight ratio of from 10:1 to 1:1, and a peroxide curing system.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 3 illustrates in perspective view, yet another hose according to some aspects of the disclosure; and, FIG. 4 depicts in perspective view, another hose according to some aspects of the disclosure.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
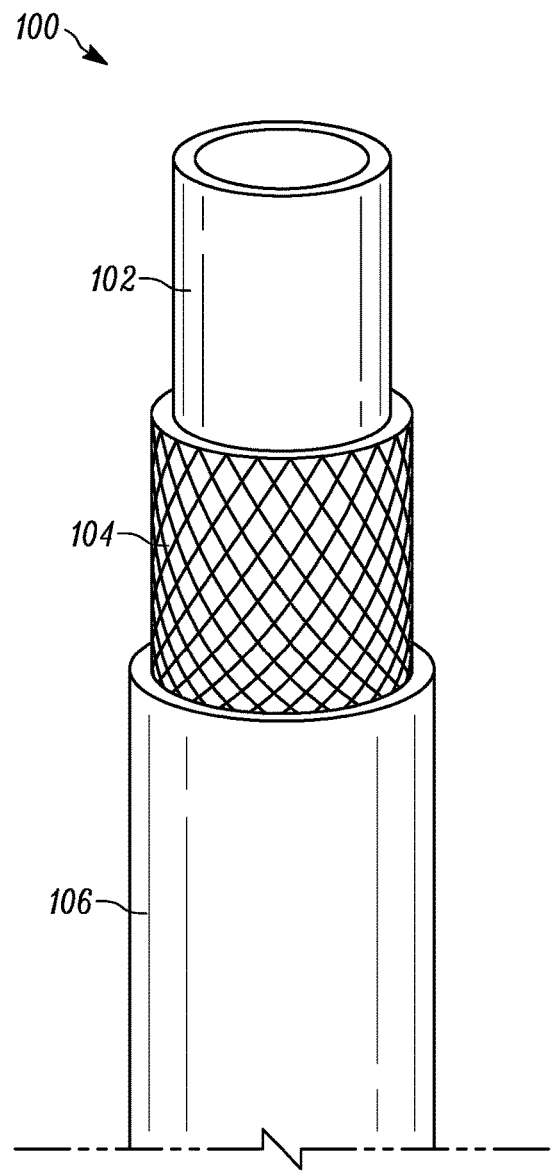
FIG. 1 illustrates in perspective view, a hose according to some aspects of the disclosure; and, FIG. 2 depicts in perspective view, another hose according to some aspects of the disclosure.

Some hose embodiments according to the disclosure have the structure shown in FIG. 1. The hose 100 is composed of at least an inner tube 102, reinforcing layer 104, and outer cover layer 106. In some aspects, the outer cover layer 106 is formed from the composition according to the disclosure. However, it is within the scope of the disclosure that either or both the inner tube 102 and the outer cover layer 106 is/are formed from the composition according to the disclosure. So long as it is in the range where the properties of the hoses of the disclosure are not impaired, a composition other than the composition of the present disclosure may also, in some aspects, be used for the inner tube 102 or outer cover layer 106.

In some hose embodiments of the disclosure, using the compositions of the disclosure for the cover layer 106, better abrasion resistance covers than XNBR covers are provided. Also, since it is not a thin film, the cover 106 avoids the problems associated with UHMWPE films. Further, by using CPE in the blend, the cover 106 compound has adequate oil resistance and flame resistance, which are normal requirements in some applications. Additionally, CPE is also significantly more cost effective compared to XNBR and UHMWPE films. In some aspects, using the compositions of the disclosure for the cover layer 106 may provide an oil resistant, ozone resistant, high-performance hydraulic hose operating at elevated temperatures which are wear resistant for dragging across rough surfaces while in service When using such a composition for the cover layer 106, the composition constituting the inner tube is not particularly limited so long as it has characteristics of an extent which does not impair the properties of the hose embodiments of the present disclosure.

Referring again to FIG. 1, in some aspects, compositions composed in inner tube 102 and/or cover layer 106 include a blend of chlorinated polyethylene (CPE) and cross-linkable oxidized high density polyethylene (oxidized HDPE). While any suitable weight ratio of CPE:oxidized HDPE may be used, in some cases the CPE and oxidized HDPE are blended in a CPE:oxidized HDPE weight ratio range of from 10:1 to 1:1, or even from 7:1 to 3:1. The compositions further include a peroxide curing system. The compositions may further include antimony trioxide as flame retardant synergist in combination with the halogenated materials. Incorporation of other conventional processing materials and materials providing desirable properties is within the spirit and scope of the disclosure.

The peroxide cured compositions including the blend of chlorinated polyethylene (CPE) and cross-linkable oxidized high density polyethylene (oxidized HDPE), according to the disclosure, may have DIN abrasion resistance values of 90 or less, 70 or less, 60 or less, 50 or less, and bottom end of DIN abrasion resistance value range may be any value less than 50, such as 30 or 40, for example. DIN abrasion resistance testing is performed in accordance with ASTM D 5963.

The curing system for the blend of chlorinated polyethylene (CPE) and oxidized HDPE is unique in that it avoids the necessity of conventional sulfur curatives, and is thus, may be devoid of such materials.

The free-radical producing curatives useful in some aspects of the disclosure are those suitable for curing polyethylene polyolefins and include for example, organic peroxides. The preferred curative is an organic peroxide, including but not limited to dicumyl peroxide, bis-(t-butyl peroxy-diisopropyl benzene, t-butyl perbenzoate, di-t-butyl peroxide, 2,5-dimethyl-2,5-di-t-butylperoxyhexane, alpha-alpha-bis(t-butylperoxy) diisopropylbenzene. A useful organic peroxide curative is alpha-alpha-bis(t-butylperoxy) diisopropylbenzene. Cure-effective amounts of organic peroxide for purposes of the disclosure are typically from about 0.5 to about 15 phr. Some useful levels of organic peroxide are from about 1 to about 12 phr. Sulfur may optionally be added to the organic peroxide curative as part of a mixed cure system in an amount of from about 0.01 to about 1.0 phr, to improve the cured elastomers Young's modulus without negatively affecting its tear resistance.

As the peroxide curing systems are capable of vulcanizing the compositions according to the disclosure, in some aspects, use of coagents synergistically with peroxides helps expand the utility of the vulcanization process. Some non-limiting examples of such coagents which may be used in the peroxide curing systems include, but are not limited to, trimethylolpropane triacrylate (TMPTA), trimethylolpropane trimethacrylate (TMPTMA), ethylene glycol dimethacrylate (EGDMA), ethylene glycol diacrylate (EGDA), N,N'-m-phenylene dimaleimide (PDM), zinc diacrylate (ZDA), zinc dimethacrylate (ZDMA), triallyl cyanurate (TAC), triallyl isocyanurate (TAlC), 90% vinyl poly(butadiene) (HVPBd), 70% vinyl styrene-butadiene copolymer (HVSBR), and the like.

While any suitable chlorinated polyethylene (CPE) materials may be useful in embodiments of the disclosure, some examples of commercially available CPE materials include the Weipren® family of products from China Yaxing, such as Weipren® 4136LS, Weipren® 7130, and the like. The range of weight ratios of CPE to oxidized HDPE may be from 10:1 to 1:1, from 7:1 to 3:1, or even from 6:1 to 4:1. In one embodiment the weight ratio of CPE to oxidized HDPE is 5:1.

In accordance with the disclosure, the cross-linkable oxidized high density polyethylene (oxidized HDPE) used in the compositions is cured by the peroxide that is included in the mixture, and the result is an improved composition where the cross-linkable oxidized high density polyethylene (oxidized HDPE) does not bloom or otherwise exude from the hose layer(s) in which it is used. Some non-limiting examples of suitable cross-linkable oxidized high density polyethylene include those based upon ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE) and the like, which are oxidized. Nonlimiting examples of cross-linkable oxidized high density polyethylene are available from Honeywell International Inc. under the brand name A-C® polyethylene, including A-C® 307, 307A, 395, 395A, and 629.

In some aspects, the oxidized HDPE is characterized by having a minimum number average molecular weight above 1000 and preferably at least about 1200, as determined by high temperature vapor pressure osmometry, containing between about 1 to about 5 percent by weight of total oxygen, and having an acid number of from 10 to about 35. The described oxidized HDPE is obtained by oxidation of polyethylene in molten or finely divided solid form, with free oxygen containing gas, usually air, generally at elevated temperature, until the desired oxygen content is obtained. Starting materials for making the oxidized HDPE include high density, linear polyethylene as, for example, prepared in the presence of such well known catalysts as the "Phillips" or "Ziegler" type catalysts, having specific gravities in the range of about 0.93-0.97 or above. The high density, linear polyethylene starting material is usually oxidized by contact, preferably in the finely divided solid state, with free oxygen-containing gas, usually air, at temperatures ranging from 100° C. up to, but not including, the crystalline melting point of the polyethylene, until the desired oxygen content has been obtained.

The compositions useful in forming the inner tube 102 and/or cover layer 106 may further include from about 1 to about 250 phr, or even from about 10 to about 70 phr, of fillers such as carbon black, calcium carbonate, talc, clay or hydrated silica, or mixtures of the foregoing. Other conventional additives, process and extender oils, antioxidants, waxes, pigments, plasticizers, softeners and the like may be added according to common rubber processing practice without departing from the disclosure. For example, in some embodiments, the elastomeric composition also contains from about 0.5 to about 1.5 phr of an antiozonant or antioxidant and from about 5 to about 15 phr of a paraffinic petroleum oil plasticizer/softener.

Referring again to FIG. 1, the reinforcing layer 104 constituting the hose 100 is not particularly limited, but like the reinforcing layer of a conventional hose may be one or more layers of a yarn produced from a vinylon fiber, rayon fiber, polyester fiber, nylon fiber, aramid fiber, etc. or a metal wire or metal alloy wire etc. braided, wrapped in a spiral, or wrapped in a plurality of spiraled layers wound in counter directions.

Further, in the production of some hoses according to the disclosure, it is possible to produce the inner tube 102 by known extrusion processes, provide an optional bonding layer or reinforcement on its outer surface if necessary, braid/spiral the reinforcing layer 104 over the same, and cover the same with the outer cover 106 by extrusion so as to bond the layers of the hose integrally. The hoses may then be cured.

Figure 2:
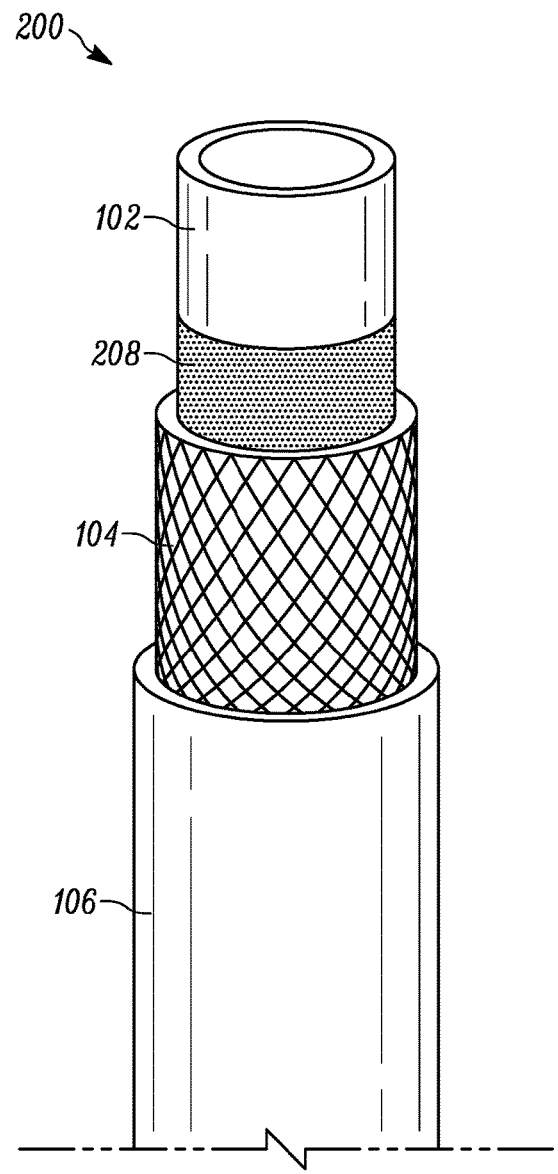

In another aspect of the disclosure, some hose embodiments have the structure shown in FIG. 2. The hose 200 includes an inner tube 102, reinforcing layer 104, outer cover 106, similar to hose 100 described above, and further includes a ply reinforcement layer 208 disposed between inner tube 102 and reinforcing layer 104. The ply reinforcement layer 208 is not particularly limited, but may be produced from a vinylon fiber, rayon fiber, polyester fiber, nylon fiber, or aramid fiber, etc. in a ply configuration.

The compositions useful in forming the cover layers in some embodiments of the disclosure may further include from about 1 to about 250 phr, or even from about 10 to about 70 phr, of fillers such as carbon black, calcium carbonate, talc, clay or hydrated silica, or mixtures of the foregoing.

In yet another aspect of the disclosure, some hose embodiments have the structure shown in FIG. 3. The hose 300 includes an inner tube 102, reinforcing layer 104, friction layer 310, second reinforcing layer 312, and outer cover 106. The second reinforcing layer 312, is not particularly limited, but may be produced from a vinylon fiber, rayon fiber, polyester fiber, nylon fiber, aromatic polyamide fiber, etc. or a hard steel wire etc. braided, wrapped in a spiral, or wrapped in a plurality of spiraled layers wound in counter directions.

In some another aspects of the disclosure, hose embodiments have the structure shown in FIG. 4. Hose 400 includes an inner tube 102, reinforcing layer 104, friction layer 310, second reinforcing layer 312, and outer cover 106. The hose further includes a ply reinforcement layer 208 disposed between inner tube 102 and reinforcing layer 104.

With regards to the reinforcing layers 104, friction layers 310, second reinforcing layers 312, outer covers 106, and ply reinforcement layers depicted above, such may be formed from any suitable materials know to those of skill in the art. In some aspects, such layers may be formed from those materials disclosed in U.S. Pat. No. 6,179,008 B1, which is incorporated herein by reference thereto.

As described above, each of the reinforcing layers may be formed by spiral winding one or more layers of a yarn or hard steel wire. In those cases where two layers of a yarn, metal wire, or metal alloy wire are used, a first layer may be spiral wound in a first winding direction, and a second layer spiral wound in a second winding direction opposite the first winding direction. In some cases, the first layer is laid at a positive angle relative to the longitudinal axis of the hose, and the second layer laid at a negative angle relative to the longitudinal axis. The angle of one of layers may be between about 45° and 65°, and the angle of the other layers between about −45° and −65°.

The friction layer used in embodiments according to the disclosure is typically from about 0.020 inches (0.5 mm) to about 0.051 inches (1.3 mm) thick, is more typically from about 0.024 inches (0.6 mm) to about 0.0.43 inches (1.1 mm) thick, and in some aspects, will be from about 0.028 inches (0.7 mm) to about 0.035 inches (0.9 mm) in thickness. The friction layer may be formed from any suitable curable rubber based composition, containing such rubber as acrylonitrile butadiene rubber (NBR), hydrogenated NBR, cross-linked NBR (XNBR), polychloroprene, fluoroelastomer, epichlorohydrin, nitrile, carboxylated nitrile rubber, CPE, CSM, or blends thereof.

The curable rubber employed in the friction layer of some hoses in accordance with the disclosure, may also contain various additives in conventional or suitable amounts known to persons having ordinary skill in the art. Such additives may include, and are not limited to, retardants to prevent an unduly quick cure, antioxidants, adhesion promoters, processing aids, reinforcing agents, talc and fillers, such as carbon black, silica, other mineral fillers, lignin, and the like. Reinforcing fillers are typically utilized at a level which is within the range of about 50 parts per hundred parts of resin (phr) to about 150 phr. In some embodiments, talc is incorporated in an amount of from about 10 phr to about 60 phr, and such may be included in compositions useful in any layers of the hoses.

Referring again to cover layers, in some embodiments according to the disclosure, cover layers have a thickness of from about 0.039 inches (1 mm) to about 0.12 inches (3 mm), from about 0.059 inches (1.5 mm) to about 0.098 inches (2.5 mm), and in some instances, about 0.067 inches (1.7 mm) to about 0.075 inches (1.9 mm). In some aspects, the cover layer can be formed from the CPE:oxidized HDPE compositions described above, or other suitable rubbers, such as polychloroprene, NBR/PVC rubber blend, NBR, epichlorohydrin rubber, chlorosulfonated polyethylene, hydrogenated NBR, fluoroelastomer, styrene-butadiene rubber, and the like, or blends thereof. Any of the materials forming the cover layer may be further loaded with metal particles, carbon black, or another electrically-conductive particulate, flake, or fiber filler so as to render the hose electrically-conductive for static dissipation or other applications. The compositions forming the cover layer also include such additives as retardants to prevent an unduly quick cure, antioxidants, adhesion promoters, processing aids, reinforcing agents and fillers, such as carbon black, silica, other mineral fillers, lignin, and the like.

As described above, the inner tube may be formed from the CPE:oxidized HDPE compositions described above, or other suitable rubbers, such as polychloroprene, NBR/PVC rubber blend, NBR, epichlorohydrin rubber, chlorosulfonated polyethylene, hydrogenated NBR, fluoroelastomer, styrene-butadiene rubber, and the like, or blends thereof. Any suitable amount of these materials may be used. Additional fillers and additives may be included in the formulation of the composition depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or anti-foaming agents, anti-static agents, coupling agents such as titanates, chain extending oils, tackifiers, flow modifiers, pigments, lubricants, silanes, and other agents, stabilizers, emulsifiers, antioxidants, thickeners, free sulfur, peroxide(s), and/or flame retardants. The formulation of the material may be compounded in a conventional mixing apparatus as an admixture of the rubber and filler components, and any additional fillers or additives.

The thickness of the inner tube in some embodiments according to the disclosure, may be from about 0.089 inches (2 mm) to about 0.157 inches (4 mm), from about 0.098 inches (2.5 mm) to about 0.138 inches (3.5 mm), and in some instances, about 0.106 inches (2.7 mm) to about 0.130 inches (3.3 mm).

Examples

The following experimental data was generated for the purpose of further illustrating the nature of some of the embodiments and aspects of the disclosure, and are not intended as a limitation on the scope thereof. The following examples were prepared to illustrate improved cover layer and/or inner tube properties for manufacturing and high performance hoses, in accordance with some aspects of the disclosure. The ingredients for each of Ex. 1 to Ex. 6 listed in Table 1, below, were mixed in a Banbury® mixer in a single pass to provide a productive blend, and the example mixtures were dropped at a temperature of 113° C. Then the example mixtures were milled to 2 mm thickness sheets and cured at 163° C. for 30 minutes. This single pass process is distinguished from a typical two pass process where a non-productive blend is first formed, followed a by a second pass with curatives included, to provide a productive blend.

Physical property testing was conducted on the cured example sheets, with values indicated in Tables 2 below. The evaluations for tensile (MPa), elongation %, and Mod 100 (MPa) were conducted according to ASTM D412. Shore A was conducted according to ASTM D2240, and Volume swell % according to ASTM D471. DIN abrasion resistance testing was performed in accordance with ASTM D 5963. Mooney scorch was conducted on a Mooney rheometer (small rotor).

TABLE 1

| Ingredient | Ex. 1 | Ex. 2 | Ex. 3 | Ex. 4 | Ex. 5 | Ex. 6 |
| --- | --- | --- | --- | --- | --- | --- |
| Weipren 7130 (CPE) | 100 | 100 | 100 | 100 | 100 | 100 |
| N220 carbon black | 25 | 25 | 25 | 25 | 25 | 25 |
| TMQ (antioxidant) | 1 | 1 | 1 | 1 | 1 | 1 |
| Paraffinic wax | 1 | 1 | 1 | 1 | 1 | 1 |
| Magnesium Oxide | 5 | 5 | 5 | 5 | 5 | 5 |
| Honeywell A-C 307A (OxHDPE) | | 20 | 20 | 20 | 20 | 20 |
| Trioctyl trimellitate (plasticizer) | 10 | 10 | 10 | 10 | 10 | 10 |
| SONGNOX 1024 (antioxidant) | 0.5 | 0.5 | 0.5 | 0.5 | 0.5 | 0.5 |
| Antimony Trioxide (flame retardant) | 4 | | 4 | 4 | 4 | 4 |
| Chlorez 700 (flame retardant) | | | 0 | 2 | 4 | 6 |
| Vul-Cup 40KE (peroxide) | 8 | 8 | 8 | 8 | 8 | 8 |
| TMPTMA (72% active) | 6 | 6 | 6 | 6 | 6 | 6 |
| PHR Running Total: | 160.5 | 176.5 | 180.5 | 182.5 | 184.5 | 186.5 |

TABLE 2

| Test | Ex. 1 | Ex. 2 | Ex. 3 | Ex. 4 | Ex. 5 | Ex. 6 |
| --- | --- | --- | --- | --- | --- | --- |
| Mooney Scorch (30 min@121° C.) | | | | | | |
| ML | 29.8 | 37.95 | 37.05 | 36.71 | 35.75 | 35.05 |
| t5 | 25.35 | 18.87 | 21.88 | 23.42 | 24.15 | 24.15 |

TABLE 2-continued

| Test | Ex. 1 | Ex. 2 | Ex. 3 | Ex. 4 | Ex. 5 | Ex. 6 |
|---|---|---|---|---|---|---|
| Rheometer (30 min@163° C.) | | | | | | |
| Min | 3.33 | 2.773 | 2.69 | 2.711 | 2.639 | 2.589 |
| Max | 33.82 | 29.4 | 29.36 | 27.82 | 26.62 | 25.65 |
| Tris1 | 0.52 | 0.55 | 0.51 | 0.52 | 0.53 | 0.53 |
| T25 | 2.58 | 3.31 | 3.34 | 3.34 | 3.36 | 3.35 |
| S25 | 10.97 | 9.431 | 9.358 | 8.989 | 8.633 | 8.355 |
| T90 | 19.11 | 21.08 | 21.18 | 21.26 | 21.36 | 21.37 |
| S90 | 30.76 | 26.74 | 26.69 | 25.31 | 24.22 | 23.35 |
| Rate | 7.19 | 4.98 | 5.67 | 5.46 | 5.33 | 5.19 |
| Amount | 30.49 | 26.63 | 26.67 | 25.11 | 22.38 | 23.06 |
| Original Physical Properties | | | | | | |
| Tensile, psi | 3382 | 2884 | 2862 | 2804 | 2791 | 2629 |
| Elongation, % | 422 | 538 | 468 | 489 | 499 | 527 |
| Mod 100, psi | 517 | 760 | 799 | 758 | 729 | 727 |
| Shore A Hardness, pts | 76 | 85 | 86 | 85 | 85 | 86 |
| DIN Abrasion (non-rotating) | 97 | 48 | 51 | 48 | 52 | 53 |
| Air Oven Age (70 hr@100° C.) | | | | | | |
| Tensile retention, % | 99 | 99 | 109 | 102 | 106 | 102 |
| Elongation retention, % | 97 | 88 | 100 | 103 | 95 | 97 |
| Hardness change, pts | 3 | 4 | 1 | 2 | 2 | 1 |
| Compression Set (24 h@100° C.) | 20 | 41 | 36 | 37 | 38 | 39 |
| MSHA Flame Test | | | | | | |
| Flame Out (sec) | 6 | 99 | 26 | 26 | 24 | 16 |
| After Glow (sec) | 30 | 78 | 45 | 87 | 53 | 64 |
| Fluid Immersion (70 hr@100° C./IRM903) | | | | | | |
| Vol Swell % | 83.45 | 86.11 | 81.2 | 84.37 | 86.66 | 89.04 |
| Static Ozone (70 hr@40° C./100 pphm, loop) | no crack | no crack | no crack | no crack | no crack | no crack |

The above test results show the advantages of using a blend of CPE and oxidized HDPE to achieve at least acceptable, if not superior properties for forming such articles as cover layers, inner tubes, and the like.

In addition to the hose applications described above, compositions according to the disclosure may be useful for other applications that require high abrasion resistance covers or layers, such as conveyor belts, power transmission belts, air spring bellows, and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising:
an inner tube,
a reinforcement layer disposed outwardly from the inner tube, and
a cover layer disposed outwardly from the reinforcement layer;
wherein the cover layer comprises a cured composition formed from a mixture comprising:
a) a blend of chlorinated polyethylene (CPE) and cross-linkable oxidized high density polyethylene (oxidized HDPE), wherein the CPE and the oxidized HDPE are blended in a CPE:oxidized HDPE weight ratio of from 10:1 to 1:1; and,
b) a peroxide curing system.

2. The hose according to claim 1, wherein the cured composition has a DIN abrasion resistance value of 70 or less.

3. The hose according to claim 1, the cover layer further comprising antimony trioxide.

4. The hose according to claim 1, wherein the peroxide curing system comprises alpha-alpha-bis(t-butylperoxy)diisopropylbenzene and trimethylolpropane trimethacrylate.

5. The hose according to claim 4, wherein the alpha-alpha-bis(t-butylperoxy)diisopropylbenzene is incorporated in an amount of from 4 phr to 8 phr, and wherein the trimethylolpropane trimethacrylate is incorporated in an amount of from 3 phr to 6 phr.

6. The hose according to claim 1, wherein the CPE:oxidized HDPE weight ratio is of from 7:1 to 3:1.

7. The hose according to claim 1, wherein the inner tube comprises a cured composition formed from a mixture comprising a blend of chlorinated polyethylene (CPE) and cross-linkable oxidized high density polyethylene (oxidized HDPE), wherein the CPE and oxidized HDPE are blended in a CPE:oxidized HDPE weight ratio of from 10:1 to 1:1.

8. The hose according to claim 1, wherein the cover layer further comprises from 10 to 70 phr of fillers selected from one or more of carbon black, calcium carbonate, talc, clay, and hydrated silica.

9. The hose according to claim 1, wherein the cover layer further comprises from 0.5 phr to 1.5 phr of an antiozonant or antioxidant, and from 5 phr to 15 phr of a paraffinic petroleum oil plasticizer.

10. The hose according to claim 1, wherein the hose consists of: the inner tube, the reinforcement layer, and the cover layer, and wherein the cover layer is a single layer.

11. The hose according to claim 1, wherein the cover layer has a thickness of from 0.059 inches to 0.098 inches.

12. The hose according to claim 1, wherein the peroxide curing system comprises one or more coagents selected from the group consisting of trimethylolpropane triacrylate (TMPTA), ethylene glycol dimethacrylate (EGDMA), ethylene glycol diacrylate (EGDA), N,N'-m-phenylene dimaleimide (PDM), zinc diacrylate (ZDA), zinc dimethacrylate (ZDMA), triallyl cyanurate (TAC), triallyl isocyanurate (TAIC), 90% vinyl poly(butadiene) (HVPBd), and 70% vinyl styrene-butadiene copolymer (HVSBR).

13. The hose according to claim 1, wherein the cross-linkable oxidized HDPE:
has a minimum number average molecular weight above 1200 as determined by high temperature vapor pressure osmometry,
comprises between 1 and 5 percent by weight of total oxygen, and
has an acid number of from 10 to 35.

14. The hose according to claim 1, wherein the oxidized HDPE is produced by oxidizing polyethylene when the polyethylene is in a molten or finely divided solid form, with free oxygen containing gas, at a temperature greater than 100° C.

* * * * *